United States Patent [19]

Hahn

[11] Patent Number: 4,506,412
[45] Date of Patent: Mar. 26, 1985

[54] FISH SKINNING AND SCALING TOOL

[76] Inventor: Marlin D. Hahn, 140 Edinburg St., San Angelo, Tex. 76902

[21] Appl. No.: 556,282

[22] Filed: Nov. 30, 1983

[51] Int. Cl.³ .................... A22C 25/02; A22C 25/17
[52] U.S. Cl. .......................................... 17/62; 17/69; 17/68
[58] Field of Search .............. 17/68, 69, 70, 62; 81/418, 420; 7/106

[56] References Cited

U.S. PATENT DOCUMENTS

| 715,915 | 12/1902 | White | 81/418 X |
|---|---|---|---|
| 717,206 | 12/1902 | Jacoby . | |
| 752,118 | 2/1904 | Stearns . | |
| 1,459,007 | 6/1923 | Wetzig . | |
| 2,434,550 | 1/1948 | Daniel | 43/29 |
| 2,654,120 | 10/1953 | Tifft | 17/7 |
| 3,395,421 | 8/1968 | Harless, Jr. | 17/68 X |
| 3,771,197 | 11/1973 | Heuer, Sr. | 17/68 |

FOREIGN PATENT DOCUMENTS 1019479 2/1966 United Kingdom ............ 7/106

Primary Examiner—Willie G. Abercrombie
Attorney, Agent, or Firm—Charles D. Gunter, Jr.

[57] ABSTRACT

A fish skinning and scaling tool is shown having a pair of mating lever units. Each of the lever units has a curved handle portion and an elongated jaw portion. The lever units are joined at a pivot point intermediate the jaw portions and handle portions. A spring carried within a spring recess between the lever units biases the handle portions apart whereby the jaw portions are biased toward an open position. Each of the jaw portions has a right angle rigid blade mounted thereon. The blades have interior edges which come together to form a gripping surface when the jaw portions are closed. The blades also have depending edges which come together to form a scaling surface when the jaw portions are closed.

2 Claims, 6 Drawing Figures

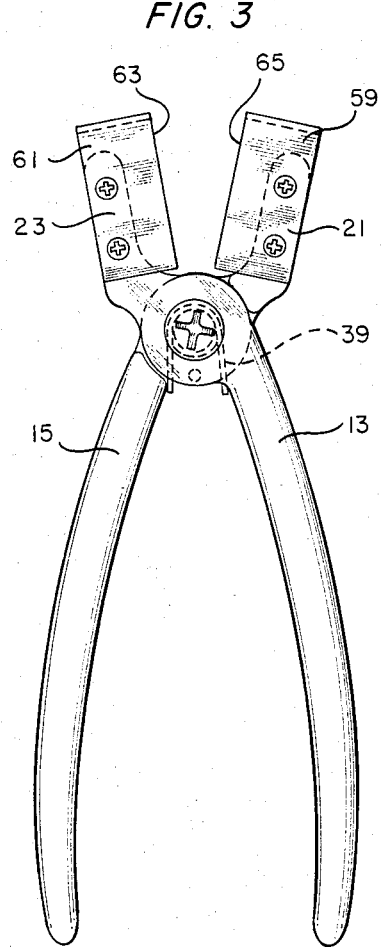
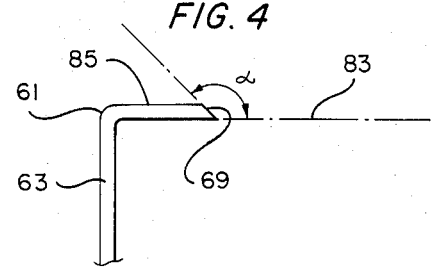
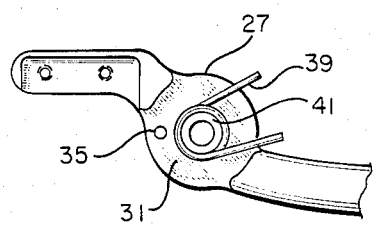
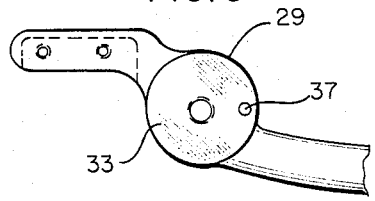

FISH SKINNING AND SCALING TOOL

BACKGROUND OF THE INVENTION

The present invention relates generally to pliers-type hand tools and, specifically, to a fish skinning and scaling tool.

In skinning a fish, two operations are normally required. First the skin of the fish is loosened, as around the base of the head, and secondly the skin is then removed. To perform these tasks, it is customary to use a sharp bladed instrument for cutting the skin loose and a pincer type tool for gripping the loosened edge of skin for removing the skin from the body. As a result, a person engaged in skinning fish will pick up and lay down the respective cutting and skinning tools countless times. Such wasted motions are inefficient and add to the time required for performing the task. Often times, one or both of the tools will become lost on the work table.

It is also desirable that the fish skinning tool be provided with a sharp edge for scaling fish. In this way, one tool can perform multiple tasks without picking up and laying down different tools which tends to allow the tools to become greasy and slippery to handle. Prior tools which were provided with a pincer type design and which were provided with sharp scaling surfaces tended to be bulky and awkwardly designed.

SUMMARY OF THE INVENTION

A fish skinning and scaling tool is shown having a pair of mating lever units. Each of the lever units has a curved handle portion and an elongated jaw portion. The lever units are joined at a pivot point intermediate the jaw portion and the handle portion. Biasing means are provided for normally biasing the handle portions apart whereby the jaw portions are biased toward an open position. Each of the jaw portions has a right angle, rigid blade mounted thereon. The blades have interior edges which come together to form a gripping surface when the jaw portions are closed. The blades have depending edges which come together to form a scaling surface when the jaw portions are closed.

The right angle, rigid blades are each formed from a flat sheet of metal which is bent at a right angle. The blade interior edges oppose each other along the entire length of the blades by flat, abutting surfaces when the jaw portions are closed. The blade depending edges can be provided with beveled outer extents.

Additional objects, features and advantages will be apparent in the written description which follows.

BRIEF DESCRIPTION OF THE DRAWINGS

FIG. 3 is a top perspective view of the tool, similar to FIG. 1 but showing the jaw portions in the open position.

FIG. 4 is a side, isolated view of one of the blades of the tool of FIG. 3.

FIG. 5 is an isolated view of one of the jaw portions of the tool of FIG. 3, shown partly broken away.

FIG. 6 is an isolated view of the other of the jaw portions of the tool of FIG. 3, shown partly broken away.

DETAILED DESCRIPTION OF THE INVENTION

Figure 1:
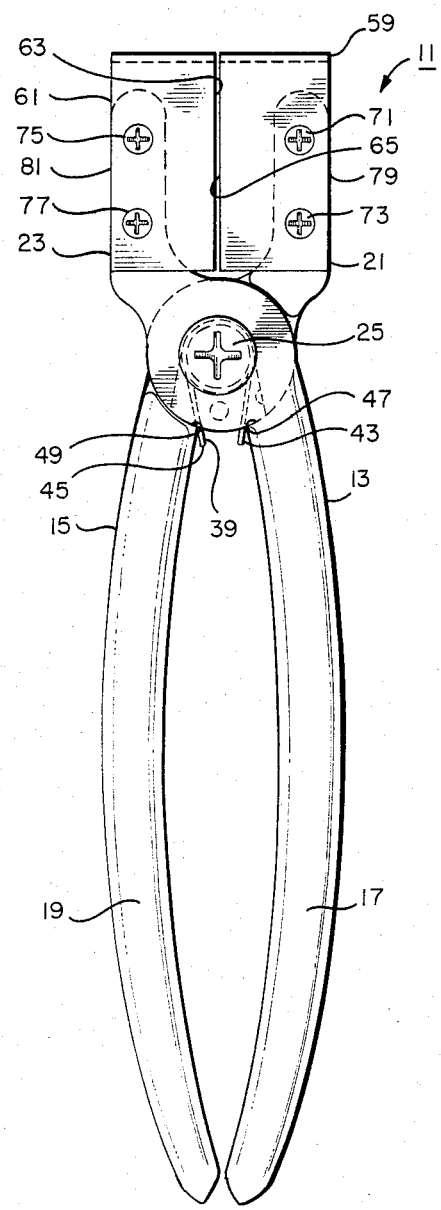
FIG. 1 is a top perspective view of the tool of the invention with the jaw portions in the closed position.

FIG. 1 shows a fish skinning and scaling tool designated generally as 11. The tool 11 includes a pair of mating lever units 13, 15, each of the lever units 13, 15 having a curved handle portion 17, 19 and an elongated jaw portion 21, 23. The lever units 13, 15 are joined at a pivot point, in this case bolt 25 located intermediate the jaw portions 21, 23 and the handle portions 17, 19.

Figure 2:
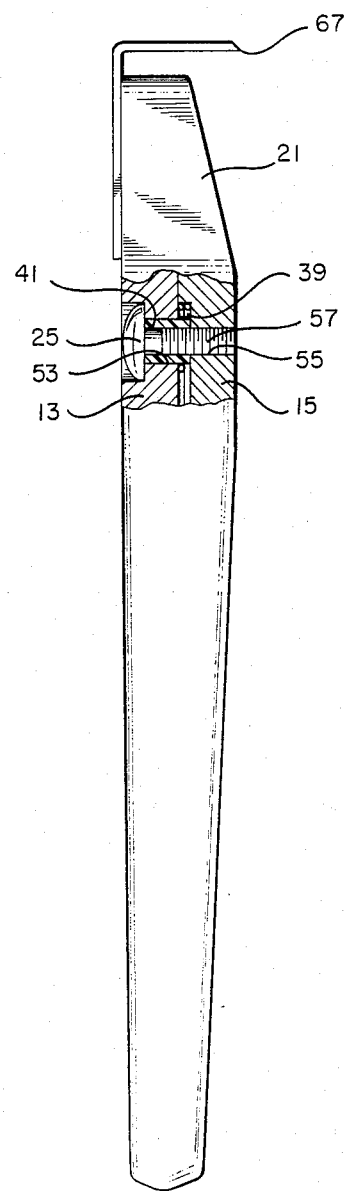
FIG. 2 is a side view of the tool of FIG. 1, partly broken away to show the pivoting mechanism thereof.

As shown in FIGS. 3, 5 and 6, each of the lever units 13, 15 is integrally formed from a single piece of metal, such as aluminum, and includes an intermediate disk-shaped portion 27, 29. The disk-shaped portions 27, 29 include facing interior surfaces 31, 33 when assembled, as shown in FIG. 2. The facing interior surfaces 31, 33 are spaced-apart by means of tabs or studs 35, 37 to provide a recess for receiving a biasing means, in this case spring 39.

As shown in FIGS. 1, 3 and 5, the spring 39 is a coiled wire which is received about a washer 41. As shown in FIG. 1, the spring has free ends 43, 45 which extend outwardly between the handle portions 17, 19 and which contact handle shoulders 47, 49, in the position shown, to thereby bias the lever units 13, 15 apart.

The lever units 13, 15, as shown in FIGS. 1 and 2, are assembled by matching up the mating disk-shaped portions 27, 29 and inserting bolt 25 through concentric, transverse bores in the lever units 13, 15. As shown in FIG. 2, the lever unit 13 has a transverse bore having an outer region 51 which narrows in internal diameter to form an inner region 53 for receiving washer 41. The lever unit 15 includes a concentric, threaded bore 55 which engages the threaded shaft 57 of the bolt 25 whereby the lever units 13, 15 are pivotable about the bolt 25.

As shown in FIG. 1, each of the jaw portions 21, 23 has a right angle, rigid blade 59, 61 mounted thereon. The blades 59, 61 have interior edges 63, 65 which come together to form a gripping surface when the jaw portions 21, 23 are closed. As shown in FIGS. 2 and 4, the jaw portions 21, 23 have depending edges 67, 69 which come together to form a scaling surface when the jaw portions 21, 23 are closed.

As best seen in FIGS. 2 and 4, each of the blades 59, 61 are formed from a flat sheet of metal, such as steel, which is bent at a right angle. The blades 59, 61 are provided with appropriate holes for receiving mounting screws 71, 73, 75, 77. Each blade 59, 61 has an exterior edge 79, 81, opposite interior edges 63, 65 which is arranged flush with the jaw portion 21, 23. The interior edges 63, 65 abut as shown in FIG. 1 with the jaw portions 21, 23 being spaced-apart as shown. As shown in FIG. 4, the depending edges 67, 69 are beveled to form an obtuse angle alpha with respect to a line 83 drawn along the axis of the depending portion 85 of each blade 61.

In operating the fish skinning and scaling tool of the invention, the handle portions 17, 19 are normally biased apart by spring 39 so that the jaw portions 21, 23 are in the open position, as shown in FIG. 3. The tool is used to scale fish by moving the handle portions 17, 19 together, thereby presenting a continuous edge formed by depending edges 67, 69 for scaling the fish. The handle portions 17, 19 can also be moved together to grip fish skin between the interior edges 63, 65. The beveled edges 67, 69 can also be used as cutting surfaces to cut the fish skin.

An invention has been provided with several advantages. The fish skinning and scaling tool allows two jobs to be performed with one tool. The need to lay down and pick up separate tools is eliminated, thereby improving efficiency. The unique steel blades are highly efficient for gripping and scaling operations. The interior edges of the blades can also be closed upon lead weights to crimp weights on a fishing line and for performing other pincer type tasks such as grasping hooks, and the like. The blade interior edges oppose each other along their entire length, thereby providing increased gripping area.

While the invention has been shown in only one of its forms, it is not thus limited but is susceptible to various changes and modifications without departing from the spirit thereof.

I claim:

1. A fish skinning and scaling tool, comprising:
    a pair of mating lever units, each of said lever units having a curved handle portion, an elongated jaw portion, and an intermediate disk-shaped portion, said lever units being pivotally joined at said intermediate disk-shaped portions;
    biasing means for normally biasing said handle portions apart whereby said jaw portions are biased toward an open position;
    each of said jaw portions having a right angle metal blade mounted thereon and formed from a flat sheet of metal, said blades having interior edges which come together to form a gripping surface when said jaw portions are closed and said blades having depending edges which come together to form a scaling surface when said jaw portions are closed; and
    wherein said blade interior edges oppose each other along the entire length of said blades by flat abutting surfaces when said jaw portions are closed and wherein said blade depending edges have outer extents which are beveled to form an obtuse angle with respect to a line drawn along the axis of the depending portion of each blade.

2. The tool of claim 1, wherein said jaw portions of said mating lever units are spaced-apart when said blade interior edges come together.

* * * * *